United States Patent
Barnes et al.

(10) Patent No.: US 6,854,415 B2
(45) Date of Patent: Feb. 15, 2005

(54) SEAT BELT TENSION SENSING DEVICE

(75) Inventors: F. Michael Barnes, Dunnellon, FL (US); Benjamin Gregory Shepherd, Fruitland Park, FL (US)

(73) Assignee: Finecard International Limited (GB)

( * ) Notice: Subject to any disclaimer, the term of this patent is extended or adjusted under 35 U.S.C. 154(b) by 0 days.

(21) Appl. No.: 10/184,725

(22) Filed: Jun. 28, 2002

(65) Prior Publication Data

US 2004/0011277 A1 Jan. 22, 2004

Related U.S. Application Data

(60) Provisional application No. 60/302,088, filed on Jun. 29, 2001.

(51) Int. Cl.⁷ .............................................. F21S 10/00
(52) U.S. Cl. .............. 116/67 R; 116/202; 116/DIG. 44; 180/270; 340/457.1
(58) Field of Search ............................... 116/205, 67 R, 116/200, 28 R, 202, 4, 209, DIG. 44; 340/438, 457.1; 280/801.1; 297/468, 483, 486, 482; 180/268, 270

(56) References Cited

U.S. PATENT DOCUMENTS

| | | | | |
|---|---|---|---|---|
| 3,817,093 A | * | 6/1974 | Williams | .................... 373/144 |
| 4,973,106 A | * | 11/1990 | Strovinskas | .................. 297/482 |
| 5,656,994 A | * | 8/1997 | Heninger | ................... 340/457.1 |
| 6,102,440 A | * | 8/2000 | Bergkessel | .................. 280/808 |
| 6,209,915 B1 | * | 4/2001 | Blakesley | ................ 280/801.1 |
| 2001/0042981 A1 | | 11/2001 | Kohut et al. | |
| 2002/0024205 A1 | * | 2/2002 | Curtis et al. | ................. 280/733 |
| 2002/0043795 A1 | | 4/2002 | Lichtinger et al. | |

FOREIGN PATENT DOCUMENTS

| | | |
|---|---|---|
| GB | 1275571 | 5/1972 |
| JP | 20011343297 | 12/2001 |
| WO | WO9912012 | 3/1999 |
| WO | WO0244679 | 6/2002 |

* cited by examiner

Primary Examiner—Diego Gutierrez
Assistant Examiner—Travis Reis
(74) Attorney, Agent, or Firm—Gauthier & Connors LLP

(57) ABSTRACT

A seat belt tension sensing device adapted for sensing tension in a belt securing a child's car seat in a vehicle, and comprising a housing (52) having a upper housing member (50) hingedly attached (at 54) to a lower housing member 52, and a closure catch (58) to permit the passage of a length of seat belt (36) through the housing to pass over a depressible switch (66). Within the housing is a power source (40) and alarm/indicator (41) responsive to a signal emitted by the switch (66) when actuated by the scar belt (36) passing over the switch. Sufficient belt tension may be shown by a visible indicator, while insufficient tension may be indicated by an audible alarm.

9 Claims, 2 Drawing Sheets

SEAT BELT TENSION SENSING DEVICE

This application claims the benefit of Provisional Application No. 60/302,088, filed Jun. 29, 2001.

This invention relates to children's car seats and how they are secured within a vehicle. More specifically, the invention provides a device for measuring belt tension in a belt holding a child's car seat on a vehicle seat to thereby assure that the belt is securely fastened.

Child car seats are being required by law in many jurisdictions, as they have been shown to greatly increase the safety of children being transported in automobiles. A child's car seat is generally fabricated to incorporate belt receiver slots or other members for therein receiving a standard automotive seat belt, so as to allow the seat belt to be used for securing the child's seat in place on the vehicle seat. Nevertheless, many children are still injured when the seat belt has not been properly secured around the child's car seat, or when the seat belt becomes accidentally loose or unfastened.

In properly positioning a child's car seat in a vehicle, a supervising adult must ensure that the belt is properly routed through the seat belt receivers on the child's car seat, that the belt end is securely connected in the belt receiving buckle, and that the belt is properly tensioned to hold the child's car seat. There has been no device available to help ascertain that the belt tension is sufficient and to indicate that the belt is properly secured around the child's car seat, or to provide an indicator that the belt continues properly tensioned around the child's seat as the vehicle is in motion.

According to the present invention, there is provided a seat belt tension sensing device adapted for sensing tension in a belt securing a child's car seat in a vehicle, said sensing device comprising a housing having a lower member and an upper member connected together so as to hold a seat belt there between; a sensor on the housing over which the belt is to pass and adapted to activate a responder including an audible and/or visible alarm/indicator to provide an indication as to whether a predetermined tension is present in the belt.

Embodiments of the invention will now be described by way of example only, with reference to the accompanying drawings, in which.

Figure 1:
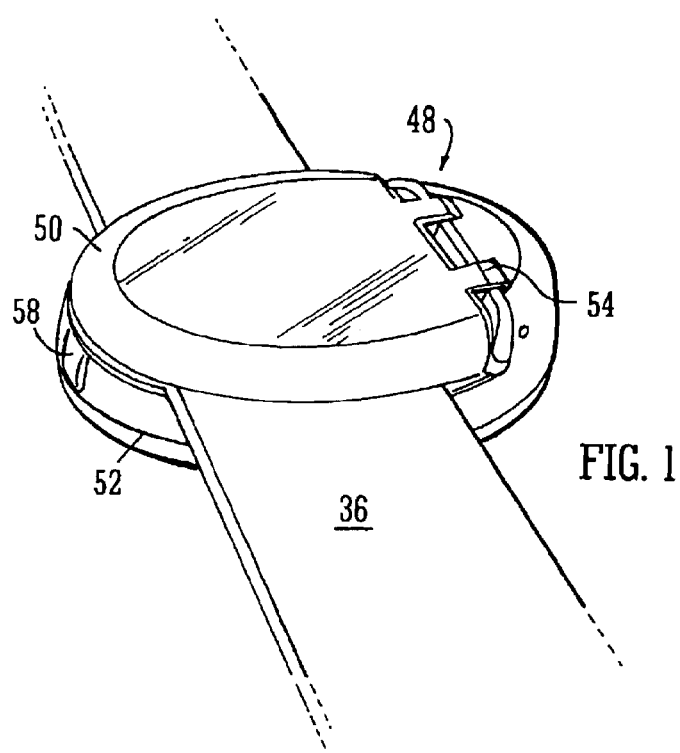
FIG. 1 shows a perspective view of a tension sensing device according to one embodiment of the present invention connected to a seat belt.
Figure 2:
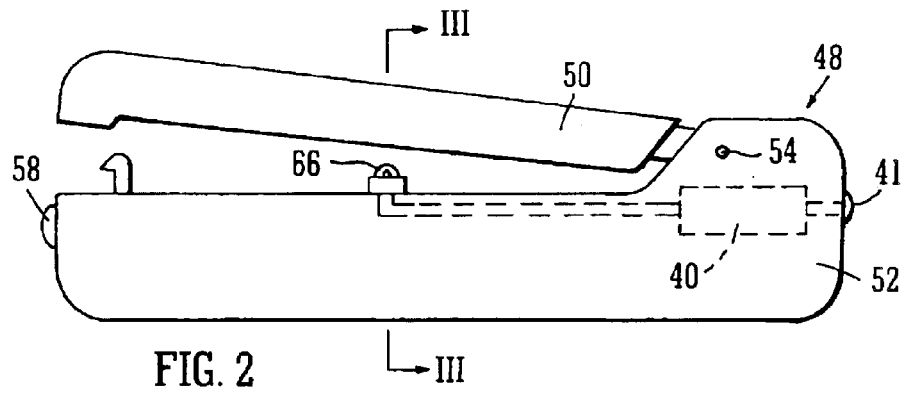
FIG. 2 is a schematic side elevation of the device shown in FIG. 1.
Figure 3:
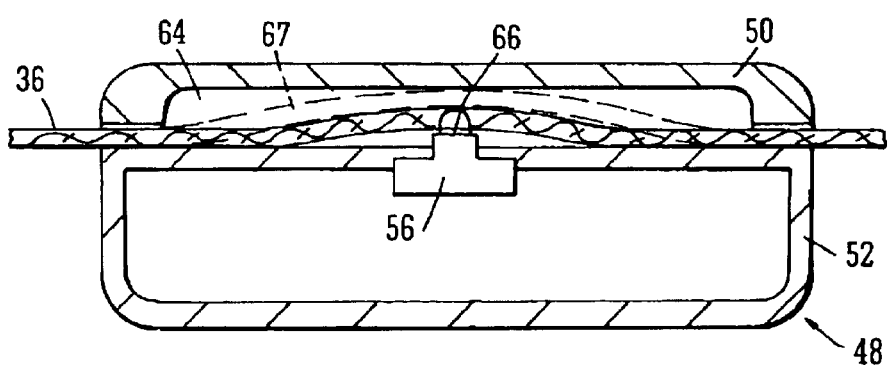
FIG. 3 is a cross-sectional view of the device taken on line III—III of FIG. 2, with the device closed.

A preferred embodiment of the invention is shown in FIGS. 1 to 3. The seat belt tension sensing device comprises a housing shaped generally as shown in FIG. 1, somewhat resembling a clamshell. The invention includes a seat belt tension sensing device adapted for sensing tension in a seat belt securing a child's care seat in a vehicle. The sensing device comprises a housing 48 having a lower member 52, an upper member 50 hingedly connected to the lower member, at 54, and a closure member or catch 58 positioned to hold the upper member in a closed relationship with the lower member so as to hold a seat belt 36 there between. A tension sensor 66 is positioned on the housing lower member 52 for sensing tension in the seat belt 36 when the belt is positioned in the device. The tension sensor 66 is responsive to that tension level present in the seat belt when properly securing a child's car seat in place in a vehicle. The tension sensor includes a pressure-sensitive member 56 which may rely on an underlying biasing member such as a spring calibrated to respond to a force indicative of sufficient tension in a seat belt to which the invention is clamped. Those skilled in the art will recognize that other mechanisms may also be used in this invention to sense pressure, for example, a fluid compression device, reed switch or other such device.

Figure 5:
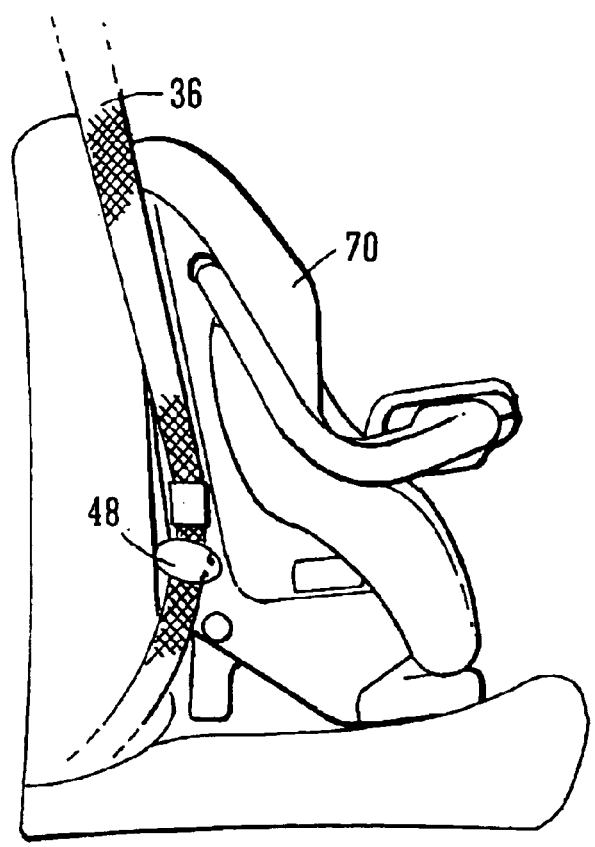
FIG. 5 shows a typical application of the device.

The seat belt tension sensing device would typically be applied to the seat belt as shown in FIG. 5, after the child's car seat 70 is properly secured with the seat belt 36, so that the seat belt would already be under tension. In operation the seat belt tension sensing device is clamped onto a seat belt onto a seat belt by releasing the closure member 58, hingedly opening the upper member 50 away from the lower member 52, positioning the width of the seat belt 36 between the upper and lower members, closing the upper member relative to the lower member so as to hold the seat belt width there between, and engaging the closure member to hold the upper member in its closed position so as to clamp down on the seat belt fabric.

The pressure sensitive member 56 is a transducer connected to a responder and power source 40 which in turn energises an audible and/or visible alarm/indicator 41.

Figure 4:
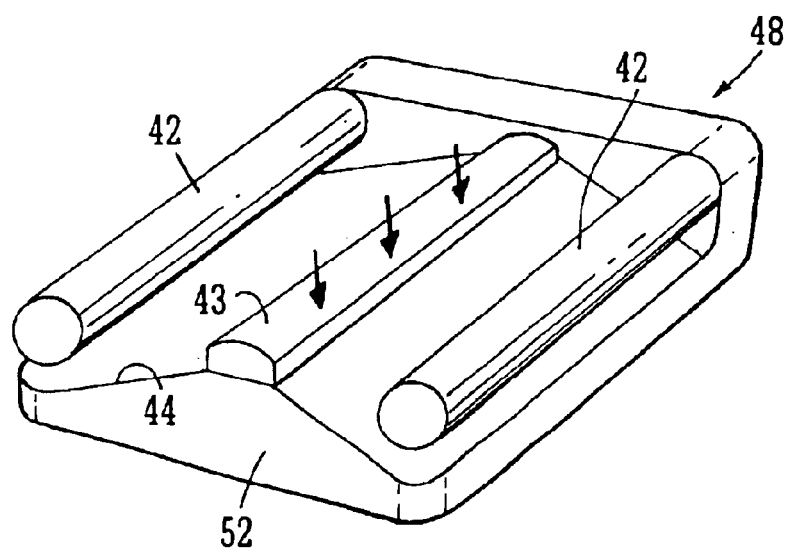
FIG. 4 is a schematic perspective view of a second embodiment.

In the embodiment shown in FIG. 4, the upper housing member 50 is replaced by a pair of circular-sectional rods or rollers 42 spaced at opposed sides of the lower housing member 52, and the tension sensor is formed as a depressible bar switch 43 over which the belt 36 passes between the rods 42 under which it passes. An upper surface 44 of the lower housing member 52 is shaped to assist in directing the belt over the bar 43.

As can be seen in FIG. 3, if the belt is sufficiently tensioned, it serves to depress switch 66, but if insufficiently tensioned it resides in the upper region 64 of the housing as shown dotted at 67 and does not activate the switch.

The sensing device may activate the alarm/indicator in response to the tension sensor sensing a sufficient tension level in the seat belt. This signal indicates that the seat belt is properly tensioned to secure the child's car seat. The invention may include also a second signal responsive to the tension sensor, preferably an audible alarm, indicating insufficient seat belt tension, possibly due to incorrect buckling of the seat belt, or accidental release of the seat belt end from the buckle.

What is claimed is:

1. A seat belt tension sensing device adapted for sensing tension in a belt securing a child's car seat in a vehicle, said sensing device comprising a housing having a lower member over which a seat securing belt may pass, an upper member connected to the lower member at one side of the housing and extending across the lower member such that a width of belt may be introduced from an opposite side to lie across the lower member beneath the upper member; an upper region within the housing in which an untensioned belt will reside; a lower region within the housing in which a belt will reside only when tensioned; a sensor within the lower region of the housing over which the belt is to pass and against which a tensioned belt will reside and adapted to activate a responder including an indicator when the belt resides in the upper region of the housing to provide an indication as to inadequate tension in the belt.

2. A seat belt tension sensing device according to claim 1, wherein the housing includes the lower member and the upper member hingedly connected to said lower member at said one side of the housing and closure means to secure said upper and lower members in closed relationship so as to hold a length of said belt therebetween.

3. A seat belt tension sensing device according to claim 2, wherein said closure means comprises a latch.

4. A seat belt tension sensing device according to claim 1, wherein said sensor is an electrical switch adapted to be depressed by the belt when under adequate tension and to be released thereby when inadequate tension is present.

5. A seat belt tension sensing device according to claim 1, wherein the upper housing member is provided in the form of a pair of rods or rollers spaced apart and attached to said one side of the housing, and the tension sensor is formed as a depressible bar switch over which the belt is to pass between the rods or rollers under which it also is to pass.

6. A seat belt tension sensing device according to claim 1, wherein the alarm/indicator comprises means producing a visible signal responsive to the sensor for indicating sufficient tension in the belt.

7. A seat belt tension sensing device according to claim 1, wherein the alarm/indicator comprises means of producing an audible signal responsive to said sensor for indicating insufficient tension in the belt.

8. A seat belt tension sensing device according to claim 1, wherein the housing contains a power source connected to the responder.

9. The seat belt tension sensing device of claim 1, wherein the indicator includes an audible or visible alarm or both.

* * * * *